US011956270B2

(12) United States Patent
Hosseini et al.

(10) Patent No.: US 11,956,270 B2
(45) Date of Patent: Apr. 9, 2024

(54) PARALLEL NETWORK-BASED VULNERABILITY SCANNING

(71) Applicant: Oracle International Corporation, Redwood Shores, CA (US)

(72) Inventors: Borhan Hosseini, Kirkland, WA (US); Vlad George Coman, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 262 days.

(21) Appl. No.: 17/670,242

(22) Filed: Feb. 11, 2022

(65) Prior Publication Data

US 2023/0262085 A1 Aug. 17, 2023

(51) Int. Cl.
*H04L 9/40* (2022.01)
*H04L 61/2539* (2022.01)
*H04L 61/2592* (2022.01)

(52) U.S. Cl.
CPC ...... *H04L 63/1433* (2013.01); *H04L 61/2539* (2013.01); *H04L 61/2592* (2013.01)

(58) Field of Classification Search
CPC ............. H04L 61/2592; H04L 61/2539; H04L 63/1433
USPC ........................................................ 726/25
See application file for complete search history.

(56) References Cited

U.S. PATENT DOCUMENTS

| 7,260,844 | B1 | 8/2007 | Tidwell et al. |
| 7,882,560 | B2 * | 2/2011 | Kraemer ............. H04L 63/1416 713/189 |
| 8,091,117 | B2 * | 1/2012 | Williams ................ H04L 63/14 726/3 |
| 8,201,257 | B1 * | 6/2012 | Andres ................. G06F 21/568 726/25 |

(Continued)

FOREIGN PATENT DOCUMENTS

CN 106559391 B 1/2021

OTHER PUBLICATIONS

"Cloud Vulnerability Scanning for AWS, Google Cloud and Azure", Intruder, Available Online at: https://www.intruder.io/cloud-vulnerability-scanning-for-aws-google-cloud-and-azure, Accessed from internet on Oct. 20, 2021, 5 pages.

(Continued)

*Primary Examiner* — Amare F Tabor
(74) *Attorney, Agent, or Firm* — Kilpatrick Townsend & Stockton LLP

(57) ABSTRACT

A computing device may receive a plurality of scanning requests with at least one scanning request in the plurality identifying a target address of a target network. The computing device may for at least a subset of the plurality of scanning requests: generate a scanner instance and a virtual network interface card (VNIC) in response to the scanning request. The scanner instance and the VNIC communicating with a routing namespace that can communicate with two or more scanner instances simultaneously. Until the target (Continued)

address has been scanned: one or more packets can be sent from the scanner instance to the target address via the routing namespace and VNIC. The one or more packets can be wrapped in one or more packet wrappers identifying the target address and the target network. In response to the target address being scanned, the scanner instance and VNIC can be decommissioned.

20 Claims, 11 Drawing Sheets

(56) References Cited

U.S. PATENT DOCUMENTS

| | | | | |
|---|---|---|---|---|
| 8,255,995 | B2 * | 8/2012 | Kraemer | G06F 21/566 |
| | | | | 713/189 |
| 8,259,571 | B1 | 9/2012 | Raphel et al. | |
| 8,347,088 | B2 * | 1/2013 | Moore | G16Z 99/00 |
| | | | | 726/2 |
| 8,413,245 | B2 * | 4/2013 | Kraemer | G06F 21/566 |
| | | | | 713/192 |
| 8,613,070 | B1 * | 12/2013 | Borzycki | H04L 67/104 |
| | | | | 726/8 |
| 8,613,083 | B1 * | 12/2013 | Njemanze | H04L 63/0218 |
| | | | | 726/22 |
| 8,661,126 | B2 * | 2/2014 | Cole | H04L 63/1416 |
| | | | | 709/224 |
| 8,776,241 | B2 * | 7/2014 | Zaitsev | H04L 63/0263 |
| | | | | 726/25 |
| 9,419,897 | B2 * | 8/2016 | Cherian | H04L 49/354 |
| 2006/0156380 | A1 * | 7/2006 | Gladstone | G06F 21/52 |
| | | | | 726/1 |
| 2015/0365412 | A1 * | 12/2015 | Innes | H04L 63/12 |
| | | | | 726/7 |

OTHER PUBLICATIONS

"Guide to Vulnerability Management", Available Online at: https://www.alias.it/scarica/e9ca97b9ecf5393727dff11e9dda10c4/, Accessed from internet on Oct. 20, 2021, 28 pages.

"Networks (Tenable.io)", Available Online at: https://docs.tenable.com/tenableio/Content/Settings/Networks.htm, Accessed from internet on Oct. 20, 2021, 2 pages.

"Overview of Event Threat Detection", Security Command Center, Available Online at: https://cloud.google.com/security-command-center/docs/concepts-event-threat-detection-overview, Accessed from internet on Oct. 20, 2021, 14 pages.

"Securing Amazon Web Services with Qualys", Available Online at: https://www.qualys.com/docs/qualys-securing-amazon-web-services.pdf, Jul. 28, 2021, 81 pages.

"Seemingly Duplicate Entries When Scanning Assets in Tenable.io", Available Online at: https://community.tenable.com/s/article/Seemingly-duplicate-entries-when-scanning-assets-in-Tenable-io, Accessed from internet on Oct. 20, 2021, 2 pages.

"Skybox Vulnerability Control", User Guide Version 11.0.200, Available Online at: https://downloads.skyboxsecurity.com/files/Installers/Skybox_View/11.0/11.0.200/Docs/Skybox_VulnerabilityControl_UsersGuide_V11_0_200.pdf, Accessed from internet on Oct. 20, 2021, 227 pages.

"Tenable.io Vulnerability Management", Available Online at: https://www.tenable.com/products/tenable-io, Accessed from internet on Oct. 20, 2021, 12 pages.

"Triggering Scans of New Assets", IBM Documentation, Available Online at: https://www.IBM.com/docs/en/qsip/7.3.3?topic=practices-triggering-scans-new-assets, Accessed from internet on Oct. 20, 2021, 2 pages.

"Using Multiple Scanner Appliances in Parallel", Available Online at: https://qualysguard.qualys.com/qwebhelp/fo_portal/scanner_appliances/scanner_parallelization.htm, Accessed from internet on Oct. 20, 2021, 1 page.

"Vulnerability Assessment Configuration Guide", IBM QRadar, Available Online at: https://www.ibm.com/docs/en/SS42VS_DSM/pdf/b_vuln.pdf, Oct. 2021, 94 pages.

"Vulnerability Management", Qualys, Inc., Available Online at: https://www.qualys.com/apps/vulnerability-management/, Accessed from internet on Oct. 20, 2021, 12 pages.

"What is the Relation Between Docker0 and Eth0?", Stack Overflow, Available Online at: https://stackoverflow.com/questions/37536687/what-is-the-relation-between-docker0-and-eth0, Accessed from Internet on Feb. 16, 2022, pp. 1-4.

Admin, "Introduction to Container Networking", Available Online at: https://www.suse.com/c/rancher_blog/introduction-to-container-networking/, Sep. 10, 2019, pp. 1-23.

* cited by examiner

PARALLEL NETWORK-BASED VULNERABILITY SCANNING

BACKGROUND

Vulnerability scanning in a cloud environment can be complicated by the addresses used within a virtual cloud network (VCN). Vulnerability scanners can use an address, such as an internet protocol version 4 (IPv4) address, to find and scan a target. However, addresses in a cloud environment are not necessarily unique and an address in one VCN can be repeated in other networks. Accordingly, techniques for performing parallel vulnerability scans in a cloud environment are desirable.

BRIEF SUMMARY

Techniques are provided for performing parallel network-based vulnerability scanning.

In an embodiment, a plurality of scanning requests can be received by a computing device. At least one of the scanning requests can identify a first target address of a first target network. A scanning request identifying the first target address and a scanning request identifying the second target address can be processed simultaneously. For at least a subset of the plurality of scanning requests: a scanner instance can be accessed and a virtual network interface card (VNIC) can be generated by the computing device. The VNIC can be in communication with a root routing namespace. The root routing namespace can be configured to communicate with two or more scanner instances in parallel. The scanner instance can be wrapped in a scanner container. Until the target address has been scanned: one or more packets can be sent from the scanner to the target address by a computer device. The one or more packets can be routed by the root routing namespace and the VNIC. The VNIC can be decommissioned in response to the target address being scanned.

In one general aspect, one or more scanning requests can have target addresses that are part of the same virtual cloud network (VCN). The one or more scanning requests can be scanned simultaneously.

In one general aspect, packets from two or more scanner instances can be forwarded by a single virtual network interface card (VNIC). The packets can correspond to two or more scanning requests.

In one general aspect, the target network can contain a scan subnet.

In one general aspect, the target address in the target network can be outside the scan subnet.

In one general aspect, the target address can be provided to the scanner instance without identifying the target network.

In one general aspect, the first target address and the second target address can be the same globally non-unique identifier.

One general aspect includes a computer-readable storage medium storing a set of instructions that when executed by one or more processors of a computing device, cause the one or more processors to perform instructions comprising: receiving a plurality of scanning requests with at least one scanning request in the plurality of scanning requests identifying a first target address of a first target network and at least one scanning request identifying a second target address of a second target network. For at least a subset of the plurality of scanning requests, where at least one scanning request identifying the first target address and at least one scanning request identifying the second target address can be processed simultaneously: accessing a scanner instance and generating a virtual network interface card (VNIC). The VNIC can be generated in response to the scanning request. The VNIC can be in communication with a routing namespace. The root routing namespace can be configured to communicate with two or more scanner instances in parallel. The scanner instance can be wrapped in a scanner container. Until the target address has been scanned: one or more packets can be sent from the scanner instance to the target address. The one or more packets can be forwarded via the root routing namespace and the virtual network interface card. In response to the target address being scanned, the virtual network interface card can be decommissioned.

One general aspect includes a system with a memory configured to store a plurality of instructions and one or more processors configured to access the memory, and to execute the plurality of instructions to at least: receive a plurality of scanning requests with at least one scanning request identifying a first target address of a first target network and at least one scanning request identifying a second target address of a second target network. For at least a subset of the plurality of scanning requests, where at least one scanning request identifying the first target address and at least one scanning request identifying the second target address can be processed simultaneously: the instructions can cause the processors to access a scanner instance and generate a virtual network interface card (VNIC). The VNIC can be generated in response to the scanning request. The scanner instance and VNIC can be in communication with a routing namespace. The root routing namespace can be configured to communicate with two or more scanner instances in parallel. The scanner instance can be wrapped in a scanner container. Until the target address has been scanned: one or more packets can be sent from the scanner instance to the target address. The one or more packets can be forwarded via the root routing namespace and the virtual network interface card. In response to the target address being scanned, and the virtual network interface card can be decommissioned.

DETAILED DESCRIPTION

Figure 1:
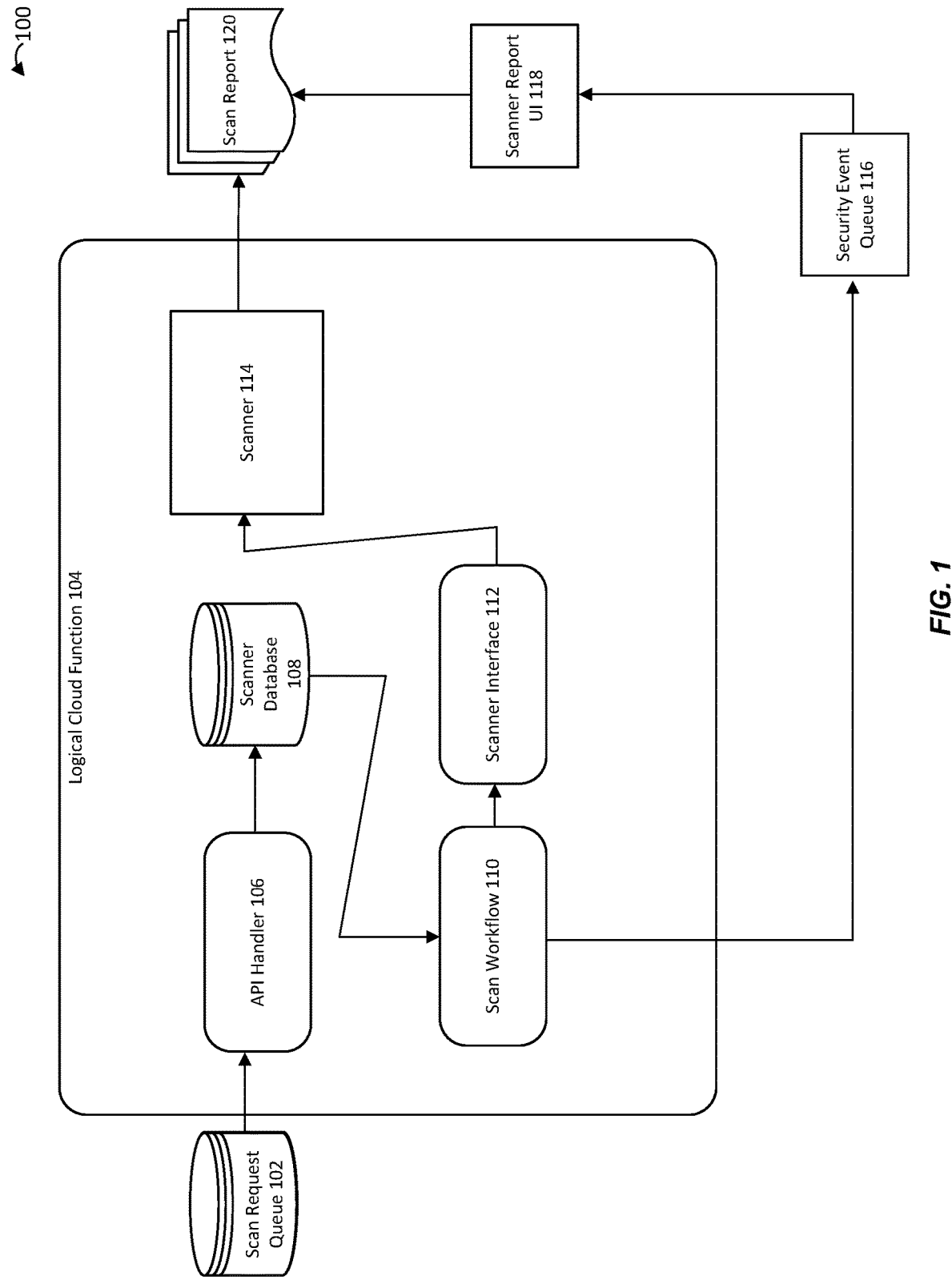
FIG. 1 shows a simplified diagram of the logical cloud function performing vulnerability scanning according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for parallel vulnerability scans in a cloud-based environment. Vulnerability scans can be used to identify weaknesses that can exist in one or more devices attached to a network. The weaknesses in the one or more devices can be exploited by unauthorized actors. A vulnerability scan can be performed on a network by scanning one or more targets that are identified by addresses used in that network. A scan can be performed in response to an event, or a scan can be performed at scheduled intervals. Event-based vulnerability scans can be used to respond to immediate damage to a network caused by a security breach. In addition to immediate damage, a security breach can cause long term damage to a cloud services provider by eroding trust within the provider's customer base.

Event-based scans can provide faster vulnerability detection than scans performed at scheduled intervals. Event based scans can be triggered by a change in vulnerability patch levels on target devices, or the event based scans can be triggered by human driven events. One example of a human driven event based scan could be a scan to respond to a critical recently-discovered vulnerability in a network to measure the networks exposure based on the vulnerability.

Vulnerability scans can identify weaknesses that can allow for security breaches, but the scans are also used to obtain compliance certifications. Compliance certifications can establish that a cloud provider is in compliance with an information technology (IT) security standard (e.g., International Organization for Standardization (ISO) 27001, ISO 27002, ISO 15408, etc.). A cloud provider may need to meet certain industry and/or government IT security standard before a government agency can use a cloud provider to run its applications. Government IT security standards can include standards from defense information systems agency (DISA), security technical implementation guides (STIGs), federal risk and authorization management program (FedRAMP), etc. A record of regular vulnerability scans can be used to gain a compliance certification by establishing that the cloud provider has implemented the relevant IT security standard. Some customers may only allow their data to be hosted on a network with one or more specific compliance certifications. For example, a United States government agency may require that their data is hosted on networks that comply with DISA STIG and FedRAMP compliance certifications.

A customer can update the devices attached to their VCN with a software patch to address vulnerabilities identified in a scan. While a cloud service provider can perform hundreds of thousands of daily scans, a common customer complaint is that there can be a long delay between the update and a subsequent scan. A customer can be unsure of whether an update has addressed an identified vulnerability until the subsequent scan has been concluded. If a device attached to the network is updated shortly after a daily scheduled scan has been performed, it can take over 24 hours until the subsequent scan has been performed and processed. The lack of responsiveness can make updating inefficient, error prone and frustrating for customers.

To improve response times, event-based vulnerability scans can be performed in parallel. With event-based vulnerability scans, a user may not have to wait over 24 hours after an update for results from a scheduled scan, because an event, such as an update, can trigger the scan. Parallel scans can also enable more scans with the same resources compared to single scans. For instance, if a logical cloud function host can support two or more scans simultaneously, a larger number of smaller scans can be performed using the same number of logical cloud function hosts.

In an illustrative example, a user patches devices on two separate cloud networks to address vulnerabilities identified in a scheduled scan. In this case, the user needs to wait for an additional scan to determine if the update has addressed the identified vulnerabilities. By updating the user's cloud infrastructure, a separate event-based scanning request is generated for each updated network. The cloud networks configuration can allow for multiple networks for the same user to share the same IP address range. This is usually not a problem as long as the two networks can be entirely separate from each other. It can become a problem when both networks are scanned by the same scanner infrastructure. In this scenario, the target address for the scanning requests are identical internet protocol version 4 (IPv4) addresses on the user's two networks hosted by the cloud infrastructure. In addition to the one or more target address, each scanning request identifies a target network. The target network can be the cloud network that contains the target address. The target network can be identified by a unique identifier that is not repeated across different networks.

Continuing the example, the target requests are picked up by an available logical cloud function host containing a routing namespace, and one or more (idle) scanners that can be used to run the scan as identified in the request. A namespace can be a Unix network namespace. The root routing namespace can be connected to a separate scanner specific routing namespace. This scanner routing namespace can have one scanner instance. Additional scanner instances can exist, and each scanner instance can use its own dedicated scanner routing namespace. The scanner instances can be created during initial host configuration and can be re-used between requests. The logical cloud function software can create a virtual network interface card (VNIC) and place it in a separate VNIC-specific routing namespace in response to each scanning request. This VNIC-specific namespace can be connected to the root routing namespace. The three namespaces can be connected together to allow packets to flow between the scanner namespace and the VNIC namespace through the root namespace as intermediary. One or more routing rules, routing tables, and network address translation (NAT) tables can also be created in response to each scanning request.

To perform each scan, the target address and the target network (e.g., the network containing the target address) can be used to configure route rules in the one or more routing tables to create a pipeline from the scanner instance to the target address. Packets can be sent to the target address via the pipeline from the scanner instance through the scanner namespace, routing namespace, VNIC namespace, and finally the VNIC itself which is connected to the target network. Responses are sent back to the scanner instance along the pipeline through the VNIC and the separate namespaces. Once the scan is concluded, the VNIC and the namespace containing the VNIC that was created to perform that scan can be decommissioned.

FIG. 1 shows a simplified diagram 100 of the logical cloud function performing vulnerability scanning according to an embodiment. Scanning requests can be received and stored in a scanning request queue 102. Scanning request queue 102 can be a priority queue with one or more queue types. The queue types can identify which type of logical cloud function should receive a queued request. Scanning requests in the scanning request queue can also be searched or filtered to allow efficient access to the queue contents. scanning requests can be performed in priority order, but, in some circumstances, there may be scanning requests that should be performed on specific scanners. If the specific scanners are not available, a lower priority scan may be performed on a different scanner before a higher priority scanning request can be performed on the specific scanner. Priority can mean the order that events will be consumed in the scanning request queue 102. Priority for event-based scans can be based at least in part on the time of the event and the type of event. In some circumstances, event-based scanning requests may be given a higher priority than periodic scanning requests.

The logical cloud function 104 can include an application programming interface (API) handler 106. An API can be software that permits applications to communicate. Logical cloud function 104 can include a scanner database 108. The scanner database 108 can provide state for API requests and individual scans. Logical cloud function 104 can include a scan workflow 110. Scan workflow 110 can support parallel scans or targeted scanning using a subset of vulnerability checks. Logical cloud function 104 can include the scanner interface 112. Scanner interface 112 can communicate with the scanner 114. Scanner 114 can be located in logical cloud function 104.

Logical cloud function 104 can communicate with the security event queue 116 via scan workflow 110. When a scan is completed, a ScanCompleted event indicating that the scan has completed can be emitted from the scan workflow 110 to the security event queue 116. The ScanCompleted event can include the location of the scan report 120 that was generated for the scan. The ScanCompleted events can be emitted from the security event queue to scanner report user interface (UI) 118. Scanner report UI 118 can poll for new scan completed events. scanner report UI 118 can consume the ScanCompleted event and, in response, scanner report UI 118 can start ingesting the scan report 120 identified by the event.

Figure 2:
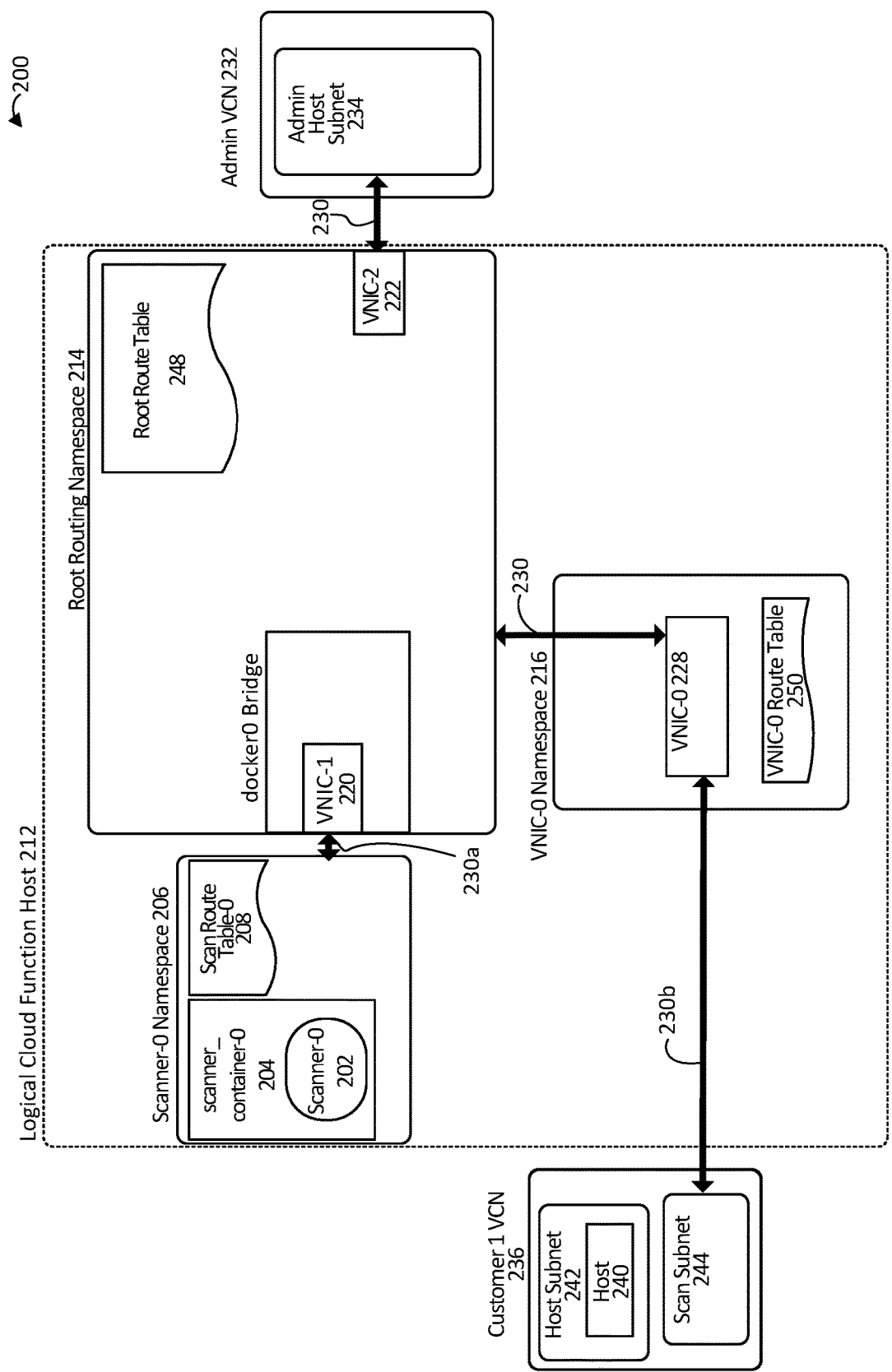
FIG. 2 is a simplified block diagram of a scanner interface and a scanner for implementations with a single scanner instance according to an embodiment.

FIG. 2 is a simplified block diagram 200 of a scanner interface and a scanner for implementations with a single scanner instance according to an embodiment. The scanner interface can be scanner interface 112 from FIG. 1. Scan workflow 110 can create and attach a VNIC to a host connecting scanner 114 and the VNIC. The connection can span scanner-0 namespace 206, root namespace 214, and VNIC-0 namespace 216. Scanner-0 namespace 206 or root namespace 214 can be permanent. VNIC-0 namespace 216 can be temporary, and VNIC-0 namespace 216 can be created by the scan workflow 110 after VNIC-0 228 is created and attached.

Turning to diagram 200 in greater detail, scanner-0 202 can be contained in scanner_container-0 204. Scanner-0 202 can be any commercially available vulnerability scanner (e.g., Nessus). Scanner_container-0 204 can be a container generated by a containerization engine (e.g., a Docker container). Scanner-0 202 and scanner_container-0 204 can be contained in scanner-0 namespace 206. Elements within scanner-0 namespace 206 can only see or use resources assigned to that namespace. Scanner-0 namespace 206 can also include a routing table 208.

Scanner-0 namespace 206 can be located in the logical cloud function host 212 along with a root routing namespace 214 and VNIC-0 routing namespace 216. A virtual network interface card (VNIC, e.g. VNIC-0 228, VNIC-1 220, VNIC-2 222, etc.) can be contained in VNIC-0 namespace 216. Packets from scanner-0 namespace 206 can be forwarded to a customer virtual cloud network (VCN, e.g., customer 1 VCN 236) via VNIC-1 220, root routing namespace 214, VNIC-0 228, and VNIC-0 namespace 216. Namespaces can be connected by an attachment 230 that can act as a virtual network cable. Packets sent or received by VNICs can be sent via an attachment 230 using communication protocols (e.g., transmission control protocol (TCP), user datagram protocol (UDP), etc.).

Root routing namespace 214 can communicate with the administrative (admin) VCN 232 via VNIC-2 222. Communication can occur between root routing namespace 214 and admin host subnet 234 in admin VCN 232 via VNIC-3 222. Instructions, such as a list of addresses to be scanned, can be received at the logical cloud function host 212 from the admin VCN 232. New scan requests can be retrieved or sent from scan request queue 102 from FIG. 1, and scan request queue 102 can be accessible through admin VCN 232 or admin host subnet 234. The admin VCN can be part of the scan workflow 110 from FIG. 1. In some circumstances, routing namespace 214 can communicate with VNIC-0 228 in VNIC-0 namespace 228. VNIC-0 228 can forward packets between a customer VCN (e.g., Customer 1 VCN 236) and root routing namespace 214.

Messages can be received at customer 1 VCN 236 through the scan subnet 244. Customer VCNs, including customer 1 VCN 236, can contain one or more hosts (e.g., host 240). In some circumstances, the host can be located in scan subnet 244. In some circumstances, host 240 can be located in a host subnet 242 that can be separate from the scan subnet 244. Communication to and from customer 1 VCN 236 may require available address space in scan subnet 244 before packets can be sent or received.

Messages, or packets, can be forwarded through a pipeline that can extend from scanner-0 202 to scan subnet 244, host subnet 242 or host 240. Packets from scanner-0 can be forwarded through this pipeline using routing rules defined using at least one of the route tables such as scan route table-0 208, root route table 248, or VNIC-0 route table 250. The unique network identifier and the target address can be used to configure routing rules in at least one route table. The configured routing rules can be used to forward packets to and from scanner-0 202 along the pipeline. Packets can be forwarded along the pipeline in both directions.

Figure 3:
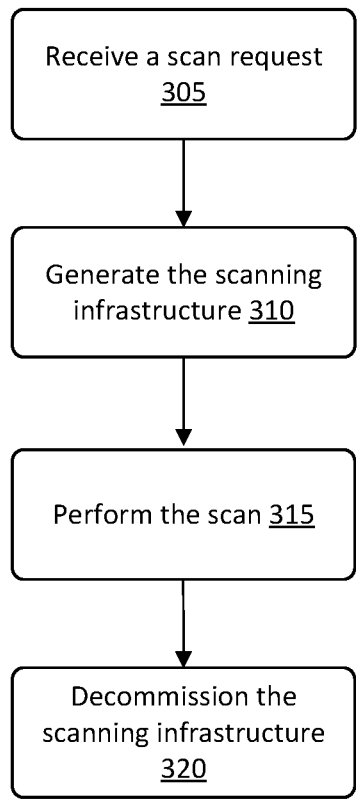
FIG. 3 is a simplified flowchart of a process for performing a scan using a single scanner instance.

FIG. 3 is a simplified flowchart of a process 300 for performing a scan using a single scanner instance. This process, in addition to the processes from FIG. 5 and the process from FIG. 6, are illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to process 300 in greater detail, at block 305 a scanning request can be received. The scanning request can be obtained by root routing namespace 214 from the admin host subnet 234 in the admin VCN 232. A scanning request can be received at the API handler 106 or the scan workflow 110 from FIG. 1, and the received scanning request can be enqueued to scanning request queue 102. The scanning request can be obtained by polling scan request queue 102 via admin host subnet 234 or admin VCN 232. The scanning request can identify one or more target addresses, e.g., an address in host subnet 242, and a target network, e.g., a unique identifier for customer 1 VCN 236, or a unique identifier for scan subnet 244. In some circumstances, the target address can be a globally non-unique identifier. For example, the target address can be an internet protocol version 4 (IPv4) address that is repeated in different customer VCNs and on the Internet. In some circumstances, the globally non-unique target addresses may not be repeated within an individual scan request or within an individual VCN.

At block 310, the scanning infrastructure can be generated. The scanning infrastructure can include a scanner instance such as scanner-0 202 or scanner 114. Generating the scanning infrastructure can also include generating a scanner namespace, one or more route tables, or a VNICs (e.g., scanner-0 namespace 206, scan route table-0 208, root route table 248, VNIC-0 route table 250, VNIC-0 228, VNIC-1 220, VNIC-2 222, etc.). In some circumstances, the scanner namespace, scan route table, or VNIC can be created on the initial scanner deployment. The scanning infrastructure can also include a virtual network interface card such as VNIC-0 228, or a VNIC-0 namespace 216.

At block 315, the scan can be performed. One or more packets can be sent from the scanner instance to one or more target addresses. For example, packets could be sent from scanner-0 202 to host 240. A packet can be forwarded to its destination via the root routing namespace (e.g., root routing namespace 214). Packets can be forwarded across the Scanner-0 namespace 206, root routing namespace 214, and VNIC-0 namespace 216 using at least one of scan route table-0 208, root route table 248, or VNIC-0 route table 250.

As an example, a packet, addressed to host 240, can be generated by scanner-0 202. The packet can leave scanner-_container-0 204. Using at least one of a target address and a customer identifier, the routing rules in scan route table-0 208, root route table 248, and VNIC-0 route table 250 can be configured to create a pipeline. The pipeline can extend from scanner-0 202 to host 240, and the pipeline can be used to forward packets from scanner-0 to host 240. Responses sent from host 240 to scanner-0 202 can also be sent along the pipeline. The packet can travel from scanner-0 namespace 206 to root routing namespace 214 via VNIC-1 220 and attachment 230a. The packet can be forwarded using the configured route rules from scan route table-0 208 or root route table 248. The packet can be routed using an internet protocol (IP) such as internet protocol version 4 (IPv4).

Continuing the example, the packet can be forwarded from root routing namespace 214 to VNIC-0 namespace 216 via VNIC-0 228. The packet can be forwarded using routing rules from root route table 248 or VNIC-0 route table 250. The packet can leave VNIC-0 namespace 216 by passing through VNIC-0 228 and attachment 230b. After leaving the logical cloud function host 212, the packet can arrive at scan subnet 244 in customer 1 VCN 236. In some circumstances, addresses within the customer VCN, such as customer 1 VCN 236, are not repeated. The packet can arrive at scan subnet 244 via the pipeline. The packet can be forwarded to the target, in this case host 240 in host subnet 242, using the globally non-unique target address that may not be repeated within customer 1 VCN 236. A response can be sent back to scanner-0 202 by sending a packet the opposite direction along the pathway described above.

At block 320, the scanning infrastructure can be decommissioned. At least one of the scanner namespace (e.g., scanner-0 namespace 206), the scanner container (e.g., scanner_container-0 204), the scanner instance (e.g., scanner-0), the VNIC (e.g., VNIC-0 228), scan route table-0 208, root route table 248, VNIC-0 route table 250, or the VNIC namespace (e.g., VNIC-0 namespace 216) can be decommissioned after performing the scan. In some circumstances, the scanner infrastructure can be decommissioned after performing one or more scans.

Figure 4:
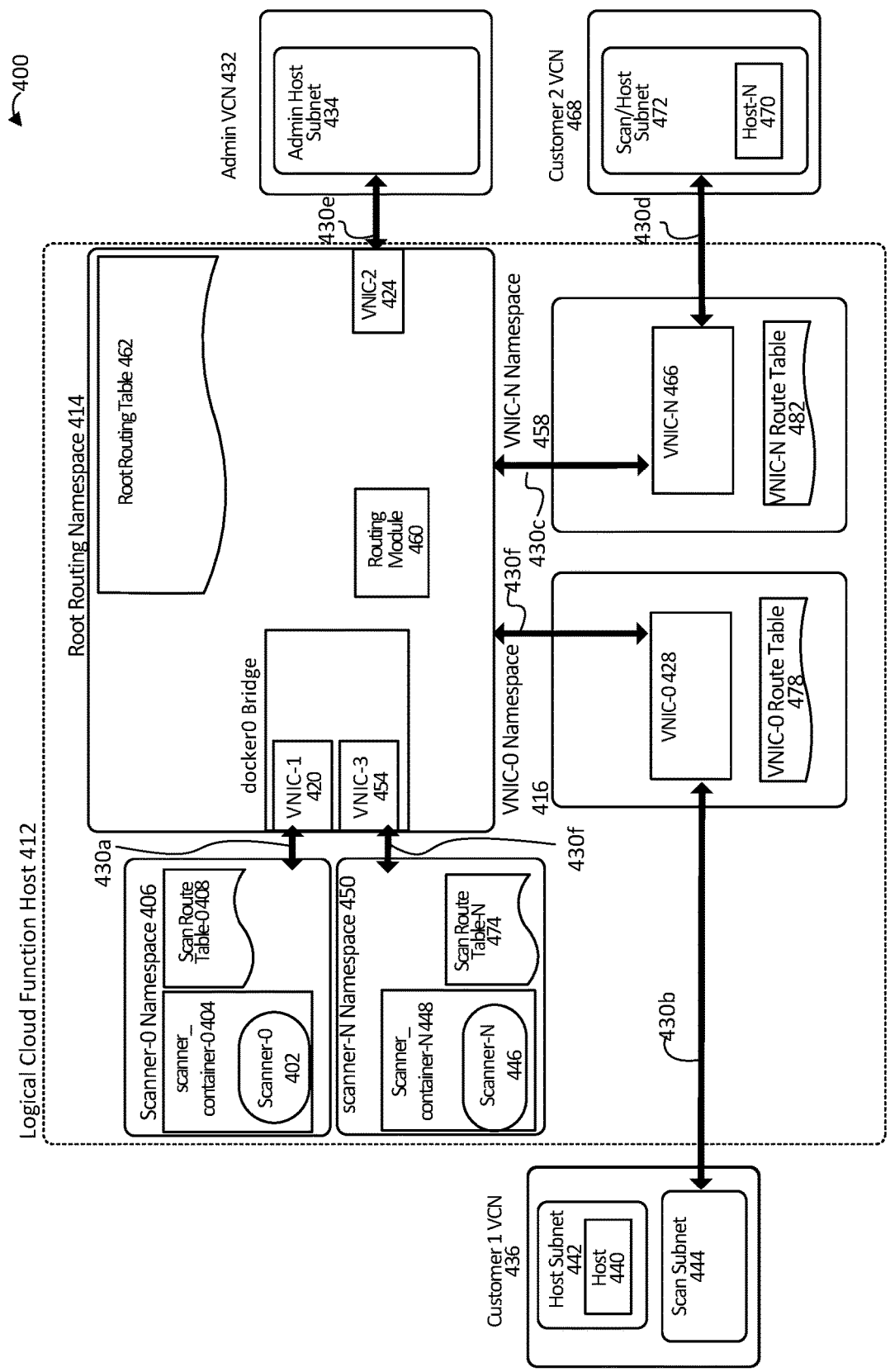
FIG. 4 is a simplified block diagram of a scanner interface and two scanners for implementations with multiple scanner instances according to an embodiment.

FIG. 4 is a simplified block diagram 400 of a scanner interface and two scanners for implementations with multiple scanner instances according to an embodiment. The description of features disclosed in relation to FIG. 2 can apply to similar features described in relation to FIG. 3.

Turning to diagram 400 in greater detail, the logical cloud function host 412 can contain two or more scanner instances (e.g., scanner-0 402 and scanner-N 446). The scanner instances can be contained in a scanner container. For example, scanner-N 446 can be contained in scanner_container-N 448. The scanner container can be located in a scanner namespace such as scanner-N namespace 450 or scanner-0 namespace 406. Two or more scanner containers can communicate with a root routing namespace (e.g., root routing namespace 414) simultaneously through a virtual network interface card (VNIC) such as VNIC-0 428 or VNIC-N 466. Packets sent from a VNIC can travel along an attachment 430 between namespaces. For example, packets sent via VNIC-1 420 can travel between scanner-0 namespace 406 and root routing namespace 414.

Packets received at root routing namespace 414 can be forwarded to a virtual network interface card (VNIC) namespace such as VNIC-0 namespace 416 or VNIC-N namespace 456. The VNIC namespaces can contain VNIC instances such as VNIC-0 428 and VNIC-N 466. In a routing infrastructure with one scanner and VNIC namespace, packets received at the root routing namespace are routed to the VNIC namespace (e.g., VNIC-0 namespace 416, etc.). In a routing infrastructure with multiple VNIC namespaces, the root routing namespace may have to determine which VNIC or VNIC namespace should receive an incoming packet. A routing module 460 can determine which VNIC or VNIC namespace should receive an incoming packet that is received from a scanner instance, scanner namespace, or scanner container. Root routing module 460 can determine which scanner instance, scanner container, or scanner namespace should receive a packet received from a VNIC. Root routing module 460 can use root routing table 462 to determine how to route packets. Root routing table 462 can include one or more routing tables. Root routing table 462 can include one or more of logical rules for routing packets or addresses.

Packets can be routed from a the routing namespace to a VNIC namespace. For example, a packet leaving root routing module 460 can be sent via VNIC-N 466 and attachment 430c into VNIC-N namespace 458. The routed packet can leave the logical cloud function host 412 via VNIC-N 466 and attachment 430d. The packet can arrive at a customer VCN, such as customer 2 VCN 468, and enter the customer VCN via a subnet. In some circumstances, the subnet can contain a host (e.g., host 470 in scan/host subnet 472).

The subnet receiving the packet can be a subnet that does not contain a host such as scan subnet 444 which is reserved for dedicated scanning use. A dedicated scan subnet reserves a set of addresses that can be leveraged by the scanner interface 112 to assign an address to the created VNIC without conflict with other devices requiring their own addressing. Using a subnet that does not contain a host, such as scan subnet 444, can reduce errors caused by a lack of available addresses because the subnet addresses can be reserved for packet ingress.

Figure 5:
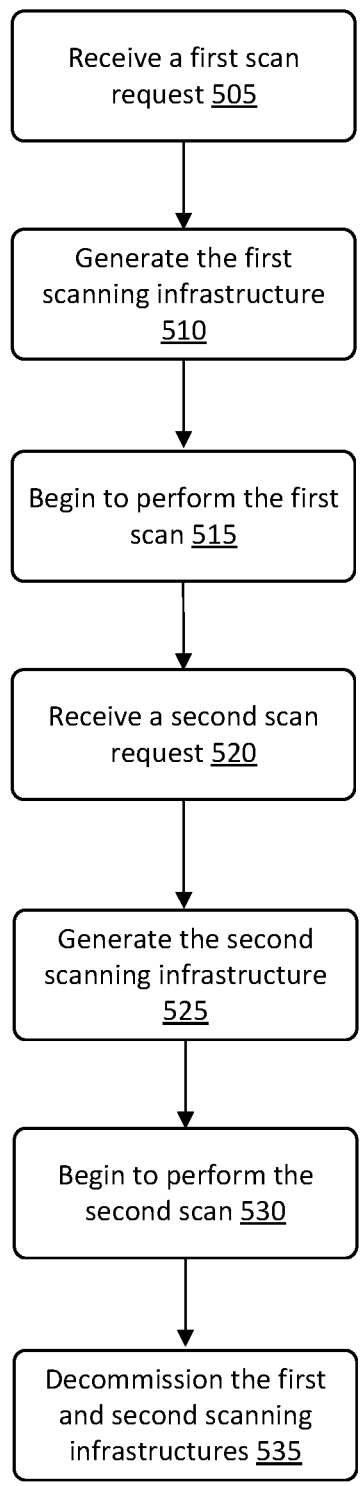
FIG. 5 shows a process for performing parallel scans with two or more scanner instances according to an embodiment.
Figure 6:
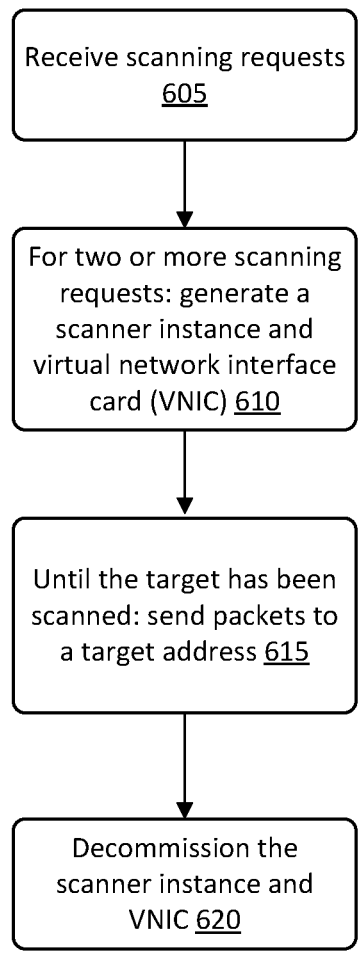
FIG. 6 shows a process for performing parallel network-based vulnerability scans according to an embodiment.

FIG. 5 shows a process 500 for performing parallel scans with two or more scanner instances according to an embodiment.

Turning to process 500 in greater detail, at block 505, a first scanning request can be received. The scanning request can be received at the root routing namespace 414 from the admin VCN 432. Scan workflow 110 can poll for scan requests from scan request queue 102. The scan workflow can poll for scan requests from scan request queue 102 through Admin VCN 432. The packet containing the first scanning request can be sent from admin host subnet 434 to root routing namespace 414 via VNIC-2 424 and attachment 430e. The first scanning request can identify one or more targets to be scanned in one or more different VCNs controlled by one or more customers.

At block 510, a first scanning infrastructure can be generated. A scanner instance (e.g., scanner-0 402) can be generated in response to receiving the first scanning request. The scanner instance can be contained in at least one of a scanner namespace, such as scanner-0 namespace 406, and/or a scanner container (e.g., scanner_container-0 404). At least one of the one or more packets containing the first scanning request can be routed to the scanner instance using routing module 460 or routing module table 462. For example, a packet can be received at routing module 460 and forwarded to scanner-0 402 via VNIC-1 420 and attachment 430a. In some circumstances, the scanner instance, scanner namespace or scanner container can be reused between scans and may not need to be created in response to receiving a scanning request.

The scanning infrastructure may be created in response to a scanning request (e.g., the first scanning request). The scanning infrastructure can include one or more of a scan route table (e.g., scan route table-0 408), a root routing table (e.g., root routing table 462), a routing module (e.g., routing module 460), a VNIC routing table (e.g., VNIC-0 route table 478, etc.), a VNIC namespace (e.g., VNIC-0 namespace 416, etc.), or a VNIC (e.g., VNIC-0 480, etc.).

At block 515, a first scan can begin. The first scan can be performed by sending one or more packets to targets that are to be scanned. The one or more targets can be identified in the first scanning request. Using at least one of a target address and a customer identifier, at least one of scan route table-0 408, root routing table 462, VNIC-0 routing table 478, or VNIC-N routing table 482 can be configured to create a first pipeline.

As an example, a packet, addressed to host 440, can be generated by scanner-0 402. The packet can leave scanner-0 namespace 406 and arrive at root routing namespace 414 via VNIC-1 420 and attachment 430a. At root routing namespace 414, the packet can be forwarded by routing module 460 to a VNIC in a VNIC namespace (e.g., VNIC-0 428 in VNIC-0 namespace 416). If more than one pipeline exists, the pipeline that receives the packet can be determined by routing module 460 using routing module table 462. The pipeline that receives the packet can be the first pipeline or a second pipeline. The second pipeline can be created using at least one of a target address and a customer identifier, at least one of scan route table-N 474, route routing table 462, VNIC-0 routing table 478, or VNIC-N routing table 482.

Continuing the example, the packet can be forwarded along the first pipeline from routing namespace 414 to VNIC-0 namespace 416 via VNIC-0 428. The packet can leave VNIC-namespace 416 by passing along the first pipeline through VNIC-0 428 and attachment 430b. After leaving the logical cloud function host 412, the packet can arrive at scan subnet 444 in customer 1 VCN 436. In some circumstances, addresses within the customer VCN, such as customer 1 VCN 436, are not repeated, but the addresses can be repeated between different customer VCNs. For example, an address in customer 1 VCN 436 and customer 2 VCN 468 can be identical. The target address can be globally non-unique target address but the target address may not be repeated within an individual VCN or individual scan requests. The packet can be forwarded to the target, in this case host 440 in host subnet 442, using the globally non-unique target address. A response can be sent back to scanner-0 402 by sending a packet the opposite direction along the first pipeline described above.

At block 520, a second scanning request can be received. The second scanning request can be received at the routing namespace 414 from scan request queue 102 via admin VCN 432. The one or more packets containing the second scanning request can be polled from the scan request queue 102 through the admin host subnet 434 to root routing namespace 414 via VNIC-2 424 and attachment 430e. The second scanning request can identify targets in one or more of the same VCNs as the targets identified in the first scanning request, or the second scanning request can identify targets in one or more VCNs that were not identified in the first scanning request.

At block 525, a second scanning infrastructure can be generated. A second scanner instance (e.g., scanner-N 446) can be generated in response to receiving the scanning request. The scanner instance can be contained in at least one of a scanner namespace, such as scanner-N namespace 450 and/or a scanner container (e.g., scanner_container-N 448). At least one of the one or more packets containing the scanner request can be routed to the scanner instance using routing module 460 or routing module table 462. For example, a packet can be received at routing module 460 and forwarded to scanner-N 446 via VNIC-3 454 and attachment 430f. In some circumstances, the scanner instance, scanner namespace or scanner container can be reused between scans and may not need to be created in response to receiving a scanning request.

The scanning infrastructure may be created in response to a scanning request (e.g., the second scanning request). The scanning infrastructure can include one or more of a scan route table (e.g., scan route table-N 474), a root routing table (e.g., root route table 462), a routing module (e.g., routing module 460), a VNIC route table (e.g., VNIC-N route table 482), a VNIC namespace (e.g., VNIC-N namespace 458), or a VNIC (e.g., VNIC-N 484).

At block 530, a second scan can begin. The second scan can be performed by sending packets one or more to one or more targets that are to be scanned. The one or more targets can be identified in the second scanning request. Using at least one of a target address and a customer identifier, at least one of scan route table-N 474, route routing table 462, VNIC-0 routing table 478, or VNIC-N routing table 482 can be configured to create a second pipeline.

As an example, a packet, addressed to Host-N 470, can be generated by scanner-N 446. The packet can leave scanner-N namespace 450 and arrive at root routing namespace 414 via VNIC-3 454 and attachment 430*f*. At routing namespace 414, the packet can be forwarded by routing module to a VNIC namespace. The pipeline that receives the packet can be determined by routing module 460 using route rules from root routing module table 462, a scan route table (e.g., scan route table-N 474) or a VNIC routing table (e.g., VNIC-N route table 482). The pipeline that receives the packet can be the first pipeline or the second pipeline.

Continuing the example, the packet can be forwarded from routing namespace 414 VNIC-N namespace 458 via VNIC-N 466 and attachment 430*c*. The packet can leave VNIC-N namespace 458 by passing along the second pipeline through VNIC-N 466 and attachment 430*d*. After leaving the logical cloud function host 412, the packet can arrive at host/scan subnet 472 in customer 2 VCN 468. In some circumstances, addresses within the customer VCN, such as customer 2 VCN 468, are not repeated, but the addresses can be repeated between different customer VCNs.

For example, an address in customer 1 VCN 436 and customer 2 VCN 468 can be identical. The packet can be unwrapped after arriving at host/scan subnet 472. The packet can be forwarded along the second pipeline to the target, in this case host-N 470 in host/scan subnet 472, using the globally non-unique target address. A response can be sent back to scanner-N 446 by sending a wrapped packet the opposite direction along the second pipeline described above.

At block 535, the first and second scanning infrastructure can be decommissioned. The scanning infrastructure can be decommissioned in response to a scan being completed. The scanning infrastructure can be decommissioned in any order and, for instance, the scanning infrastructure created in response to the second scanning request can be decommissioned before the first scanning infrastructure. The scanning infrastructure can include one or more of a scan route table (e.g., scan route table-N 474), a root routing table (e.g., root route table 462), a routing module (e.g., routing module 460), a VNIC route table (e.g., VNIC-N route table 482), a VNIC namespace (e.g., VNIC-N namespace 458), or a VNIC (e.g., VNIC-N 466).

FIG. 6 shows a process 600 for performing parallel network-based vulnerability scans according to an embodiment. At block 605, scanning requests can be received. Two or more scanning requests can be received at routing namespace 414 from admin VCN 432 as described above in relation to FIGS. 4 and 5.

At block 610, for at least two of the two or more scanning requests, a scanner instance and a virtual network interface card (VNIC) can be generated in response to the scanning request. A scanner instance and VNIC can be generated for two or more scanning requests identifying separate VCNs (e.g., VCN 432). The scanner instance and VNIC can include a scanning infrastructure as described above in relation to FIGS. 4 and 5. The scanning infrastructure can include one or more of a scan route table (e.g., scan route table-N 474), a root routing table (e.g., root route table 462), a routing module (e.g., routing module 460), a VNIC route table (e.g., VNIC-N route table 482), a VNIC namespace (e.g., VNIC-N namespace 458), or a VNIC (e.g., VNIC-N 466).

At block 615, for at least two of the two or more scanning requests, packets can be sent to a target address until the target address has been scanned. The target address can identify a device (e.g., host 440 or host-N 470) in a customer VCN such as customer 1 VCN 436 or Customer 2 VCN 468. The process of sending packets to a target address is described in greater detail above in relation to FIGS. 4 and 5.

At block 620, for at least two of the two or more scanning requests, the scanning infrastructure. The scanning infrastructure can be decommissioned in response to scanning the targets identified in the scanning request. In some circumstances, the scanning infrastructure can be decommissioned in response to a determination that the targets identified in the scanning request have been scanned or the targets cannot be scanned. The process of decommissioning the scanner instance and VNIC are described in greater detail above in relation to FIGS. 4 and 5.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
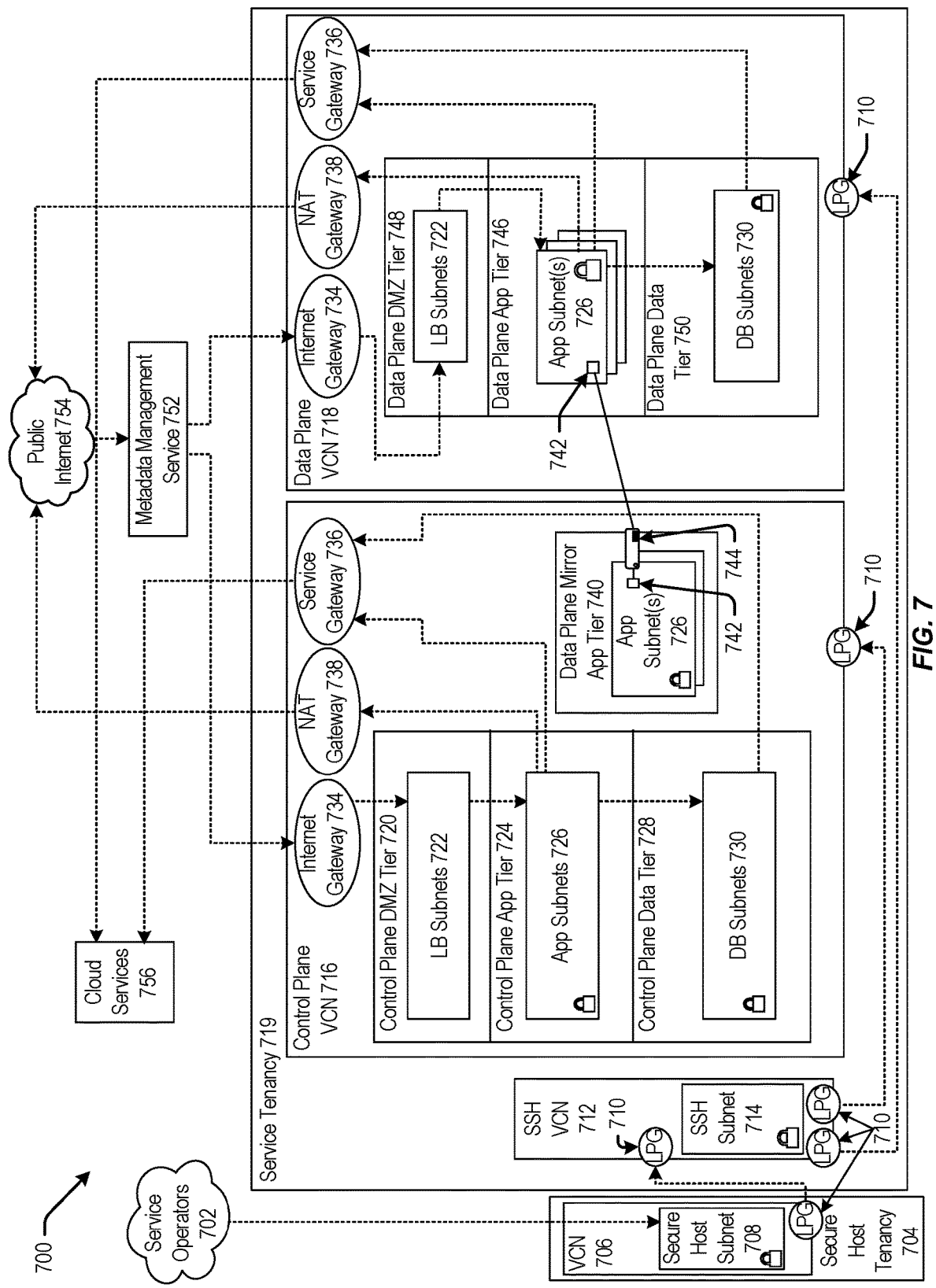
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
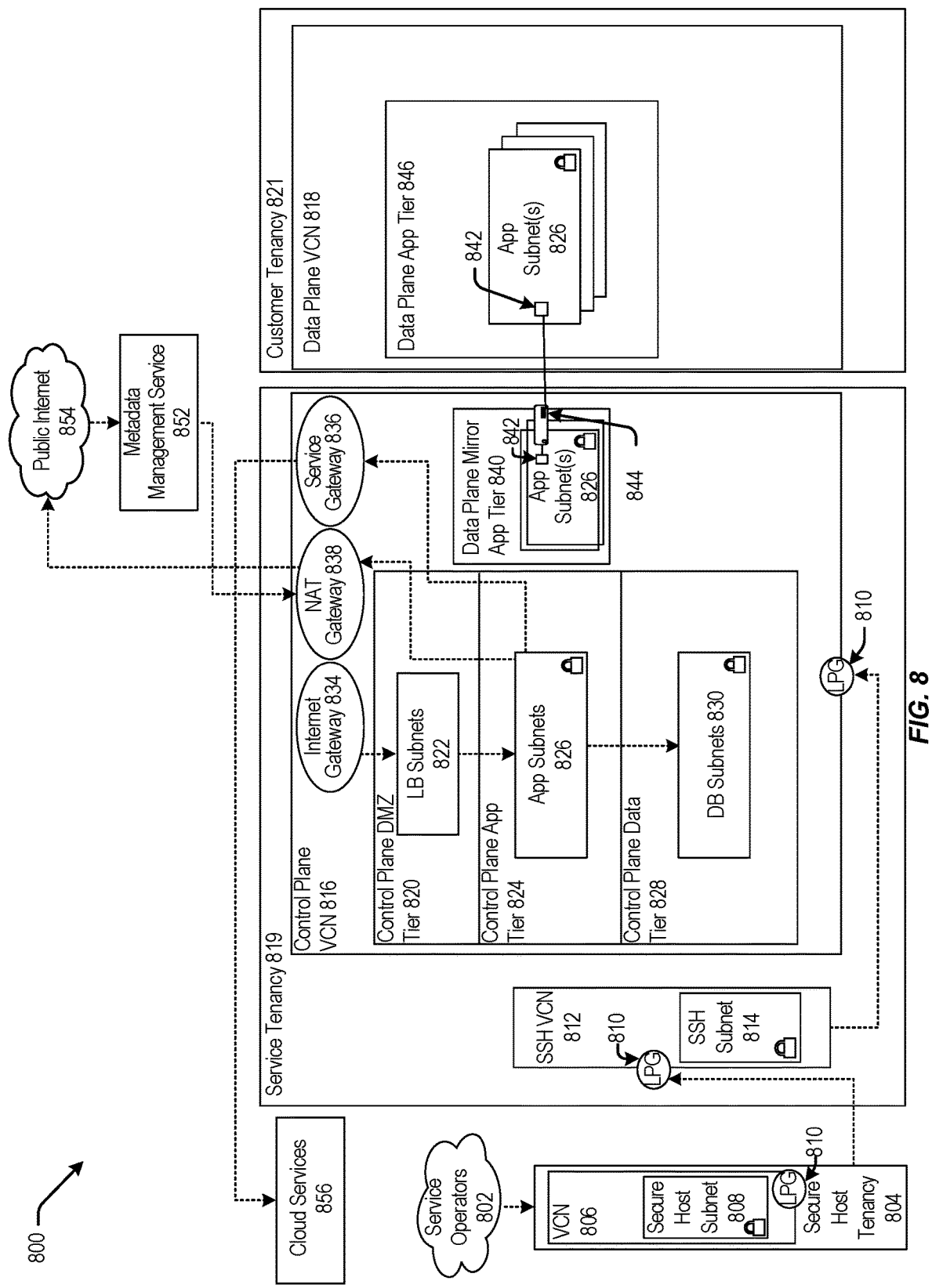
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
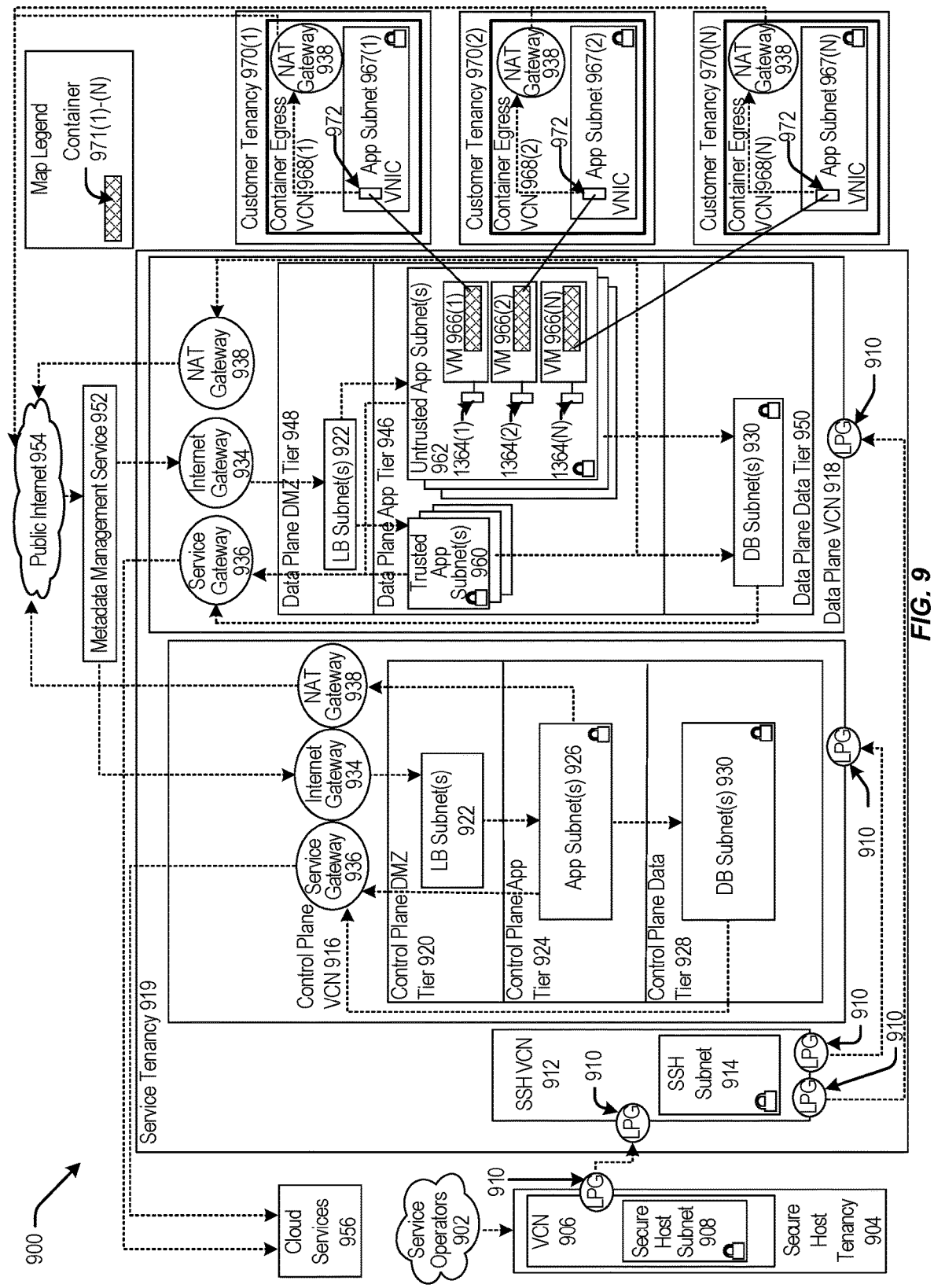
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
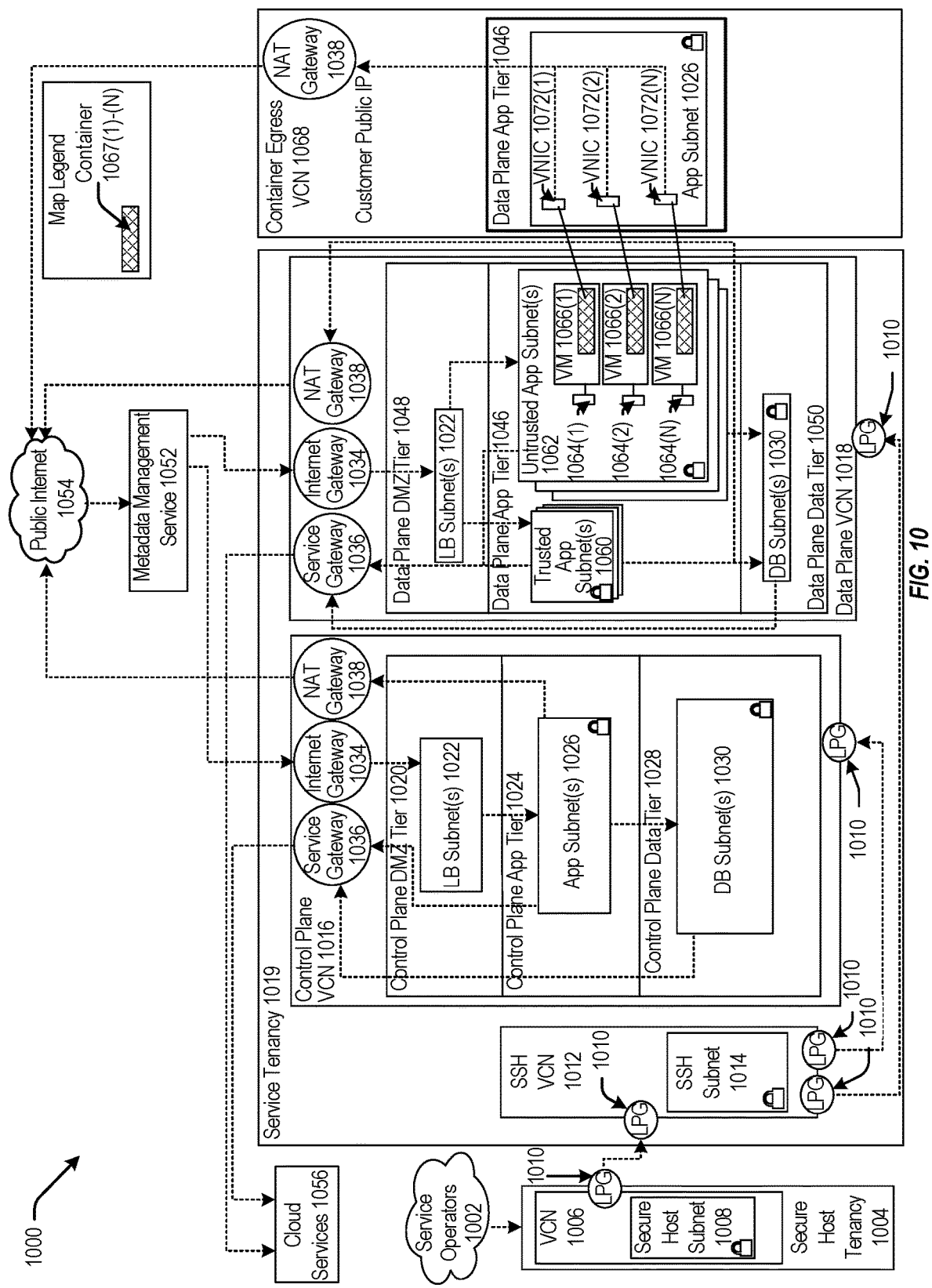
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
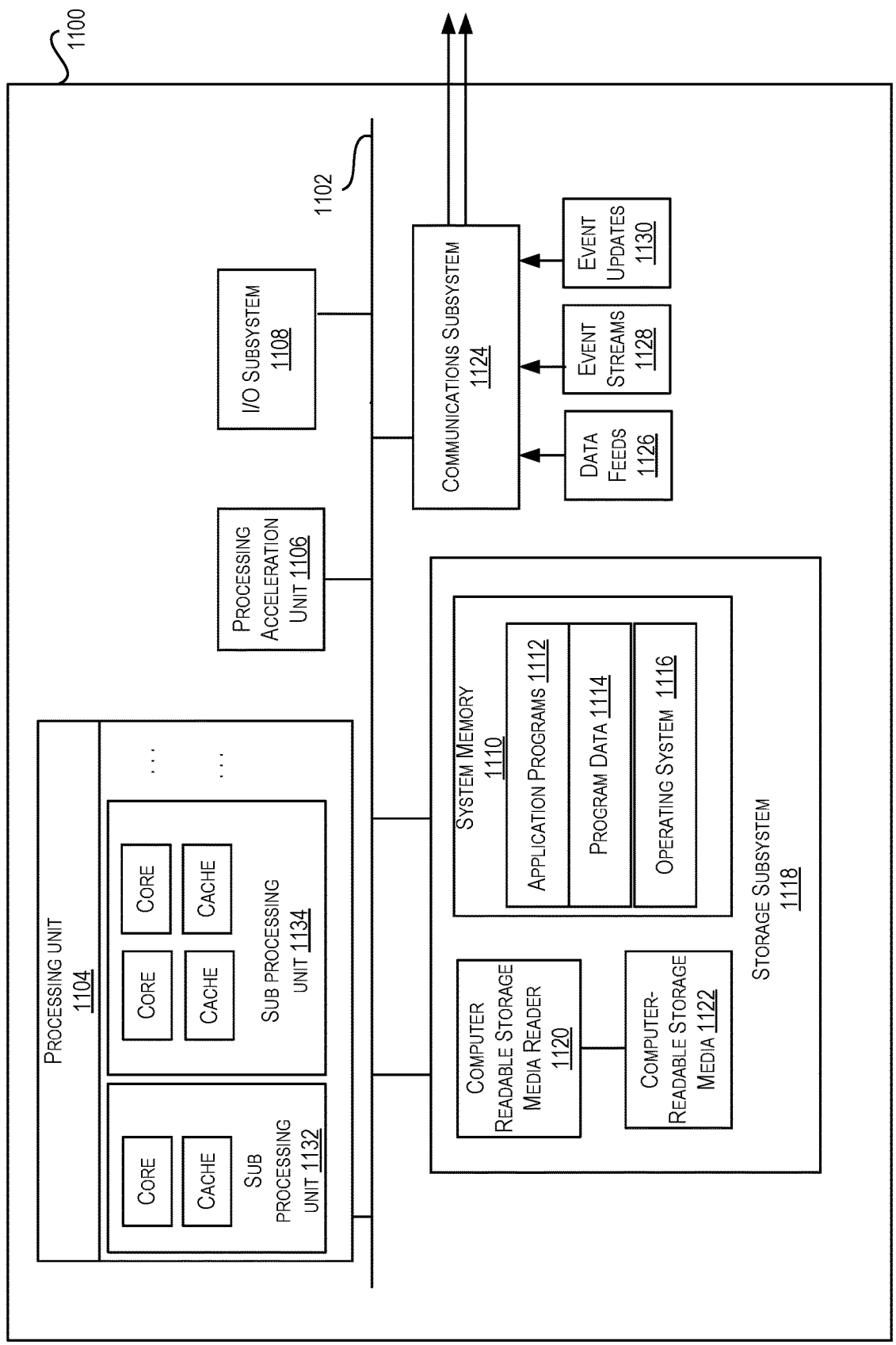
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
receiving, by a computing device, a plurality of scanning requests, at least one scanning request in the plurality of scanning requests identifying a first target address in a first target network and at least one scanning request in the plurality of scanning requests identifying a second target address in a second target network; and
for at least a subset of the plurality of scanning requests in the plurality of scanning requests, where at least one scanning request identifying the first target address in one network and at least one scanning request identifying the second target address in a separate network are processed simultaneously:
accessing, by the computing device, a scanner instance;
generating, by the computing device and in response to the scanning request, a virtual network interface card (VNIC), the scanner instance and the virtual network interface card being in communication with a root routing namespace, the root routing namespace being configured to communicate with two or more scanner instances in parallel, and the scanner instance being wrapped in a scanner container;
until the target address has been scanned:
sending, by the computing device, one or more packets from the scanner instance to the target address, the one or more packets being forwarded via the root routing namespace and the virtual network interface card, and the one or more packets being wrapped in one or more packet wrappers identifying the target address and the target network; and
decommissioning, by the computing device and in response to the target address being scanned, the virtual network interface card.

2. The method of claim 1, wherein two or more scanning requests, comprising target addresses that are part of a same virtual cloud network (VCN), are scanned simultaneously.

3. The method of claim 2, wherein packets from two or more scanner instances, corresponding to the two or more scanning requests, are forwarded by a single virtual network interface card (VNIC).

4. The method of claim 1, wherein the target network contains a scan subnet.

5. The method of claim 4, wherein the target address in the target network is outside the scan subnet.

6. The method of claim 1, wherein the target address is provided to the scanner instance without identifying the target network.

7. The method of claim 1, wherein the first target address and the second target address are the same globally non-unique identifier.

8. A non-transitory computer-readable medium storing a set of instructions comprising one or more instructions that, when executed by one or more processors of a computing device, cause the one or more processors to perform operations comprising:
receiving a plurality of scanning requests, at least one scanning request in the plurality of scanning requests identifying a first target address of a first target network and at least one scanning request in the plurality of scanning requests identifying a second target address in a second target network;

for at least a subset of the plurality of scanning requests in the plurality of scanning requests, where at least one scanning request identifying the first target address in one network and at least one scanning request identifying the second target address in a separate network are processed simultaneously:
  accessing, by the computing device, a scanner instance;
  generating, in response to the scanning request, a virtual network interface card (VNIC), the scanner instance and the virtual network interface card being in communication with a root routing namespace, the root routing namespace being configured to communicate with two or more scanner instances in parallel, and the scanner instance being wrapped in a scanner container; until the target address has been scanned:
    sending one or more packets from the scanner instance to the target address, the one or more packets being forwarded via the root routing namespace and the virtual network interface card, and the one or more packets being wrapped in one or more packet wrappers identifying the target address and the target network; and
  decommissioning, in response to the target address being scanned the virtual network interface card.

9. The non-transitory computer-readable of claim 8, wherein two or more scanning requests, with target addresses that are part of the same virtual cloud network (VCN), are scanned simultaneously.

10. The non-transitory computer-readable of claim 9, wherein packets from two or more scanner instances, corresponding to the two or more scanning requests, are forwarded by a single virtual network interface card (VNIC).

11. The non-transitory computer-readable of claim 8, wherein the target network contains a scan subnet.

12. The non-transitory computer-readable of claim 11, wherein the target address in the target network is outside the scan subnet.

13. The non-transitory computer-readable of claim 8, wherein the target address is provided to the scanner instance without identifying the target network.

14. The non-transitory computer-readable medium of claim 8, wherein the target address is a globally non-unique identifier.

15. A computing device, comprising:
  one or more memories; and
  one or more processors, communicatively coupled to the one or more memories, configured to:
    receive a plurality of scanning requests, at least one scanning request in the plurality of scanning requests identifying a first target address of a first target network and at least one scanning request in the plurality of scanning requests identifying a second target address in a second target network;
    for at least a subset of the plurality of scanning requests in the plurality of scanning requests, where at least one scanning request identifying the first target address in one network and at least one scanning request identifying the second target address in a separate network are processed simultaneously:
      access a scanner instance;
      generate, in response to the scanning request, a virtual network interface card (VNIC), the scanner instance and the virtual network interface card being in communication with a root routing namespace, the root routing namespace being configured to communicate with two or more scanner instances in parallel, and the scanner instance being wrapped in a scanner container;
      until the target address has been scanned:
        send one or more packets from the scanner instance to the target address, the one or more packets being forwarded via the root routing namespace and the virtual network interface card, and the one or more packets being wrapped in one or more packet wrappers identifying the target address and the target network; and
      decommission, in response to the target address being scanned, the virtual network interface card.

16. The device of claim 15, wherein two or more scanning requests, with target addresses that are part of the same virtual cloud network (VCN), are scanned simultaneously.

17. The device of claim 16, wherein packets from two or more scanner instances, corresponding to the two or more scanning requests, are forwarded by a single virtual network interface card (VNIC).

18. The device of claim 15, wherein the target network contains a scan subnet.

19. The device of claim 18, wherein the target address in the target network is outside the scan subnet.

20. The device of claim 15, wherein the target address is provided to the scanner instance without identifying the target network.

* * * * *

UNITED STATES PATENT AND TRADEMARK OFFICE
CERTIFICATE OF CORRECTION

PATENT NO. : 11,956,270 B2
APPLICATION NO. : 17/670242
DATED : April 9, 2024
INVENTOR(S) : Hosseini et al.

Page 1 of 1

It is certified that error appears in the above-identified patent and that said Letters Patent is hereby corrected as shown below:

In the Specification

In Column 5, Line 18, delete "contents." and insert -- contents --, therefor.

In Column 5, Line 52, delete "scanner" and insert -- Scanner --, therefor.

In Column 9, Line 4, delete "a the" and insert -- a --, therefor.

In Column 10, Line 22, delete "VNIC-namespace" and insert -- VNIC-0 namespace --, therefor.

In the Claims

In Column 29, Line 25, in Claim 9, before "of" insert -- medium --, therefor.

In Column 29, Line 29, in Claim 10, before "of" insert -- medium --, therefor.

In Column 29, Line 33, in Claim 11, before "of" insert -- medium --, therefor.

In Column 29, Line 35, in Claim 12, before "of" insert -- medium --, therefor.

In Column 29, Line 38, in Claim 13, before "of" insert -- medium --, therefor.

Signed and Sealed this
Fourth Day of March, 2025

Coke Morgan Stewart
*Acting Director of the United States Patent and Trademark Office*